US010279808B2

(12) United States Patent
Drown et al.

(10) Patent No.: US 10,279,808 B2
(45) Date of Patent: May 7, 2019

(54) ADAPTIVE CRUISE CONTROL SYSTEM WITH SPEED BASED MODE

(71) Applicant: Bendix Commercial Vehicle Systems LLC, Elyria, OH (US)

(72) Inventors: Jeffery E Drown, Clyde, OH (US); Vipin A. Guda, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 52 days.

(21) Appl. No.: 15/597,780

(22) Filed: May 17, 2017

(65) Prior Publication Data
US 2018/0334167 A1 Nov. 22, 2018

(51) Int. Cl.
*B60W 30/16* (2012.01)
*B60W 30/14* (2006.01)
*B60W 10/06* (2006.01)
*B60W 10/18* (2012.01)
*B60W 50/14* (2012.01)

(52) U.S. Cl.
CPC ............ *B60W 30/16* (2013.01); *B60W 10/06* (2013.01); *B60W 10/18* (2013.01); *B60W 30/143* (2013.01); *B60W 50/14* (2013.01); *B60W 2050/146* (2013.01); *B60W 2420/42* (2013.01); *B60W 2420/52* (2013.01); *B60W 2510/18* (2013.01); *B60W 2550/40* (2013.01); *B60W 2710/18* (2013.01); *B60W 2750/308* (2013.01)

(58) Field of Classification Search
CPC ...... B60W 30/16; B60W 10/18; B60W 10/06; B60W 30/143; B60W 2420/42; B60W 2550/40; B60W 50/14; B60W 2420/52; B60W 2750/308; B60W 2710/18; B60W 2510/18; B60W 2050/146
See application file for complete search history.

(56) References Cited

U.S. PATENT DOCUMENTS

| 5,749,426 | A | 5/1998 | Gilling |
| 6,618,000 | B2 | 9/2003 | Winner |
| 6,708,099 | B2* | 3/2004 | Tellis ................. B60K 31/0008 180/167 |
| 7,440,835 | B2 | 10/2008 | Shima |
| 7,457,699 | B2 | 11/2008 | Chia |

(Continued)

OTHER PUBLICATIONS

Bendix Commercial Vehicle Systems LLC, "SD-61-4963 The Bendix Wingman Fusion Driver Assistance System," Service Data Sheet, Jul. 2016, 84 pages, Bendix Commercial Vehicle Systems, Elyria Ohio, U.S.A.

(Continued)

*Primary Examiner* — Yuen H Wong
(74) *Attorney, Agent, or Firm* — Cheryl L. Greenly; Brian E. Kondas; Eugene E. Clair

(57) ABSTRACT

A controller for an adaptive cruise control system having a speed based mode includes an input for receiving a signal indicative of a detected target object, an input for receiving the speed of the host vehicle and control logic. The control logic is capable of transmitting messages to maintain the vehicle at a preset time gap from the target object upon receiving the signal indicative of a target object and transmitting messages to set the vehicle at a predetermined following distance from the target object in response to the speed of the host vehicle being less than or equal to a minimum speed.

9 Claims, 3 Drawing Sheets

(56) References Cited

U.S. PATENT DOCUMENTS

| | | |
|---|---|---|
| 8,396,641 B2 | 3/2013 | Maruyama |
| 8,504,275 B2 | 8/2013 | Schwindt |
| 8,515,644 B2 | 8/2013 | Leineweber |
| 8,688,349 B2 | 4/2014 | Grolle |
| 9,026,335 B2 | 5/2015 | Sauer |
| 2015/0073663 A1* | 3/2015 | Nilsson ................. B60W 30/08 701/41 |
| 2016/0176402 A1* | 6/2016 | Andersson ............ B60W 30/16 701/96 |

OTHER PUBLICATIONS

Bendix Commercial Vehicle Systems LLC, "SD-13-3333 Bendix Wingman ACB (Active Cruise with Braking)," Service Data Sheet, May 2012, 52 pages, Bendix Commercial Vehicle Systems, Elyria Ohio, U.S.A.

* cited by examiner

ADAPTIVE CRUISE CONTROL SYSTEM WITH SPEED BASED MODE

BACKGROUND

The present invention relates to embodiments of an adaptive cruise control system with speed based modes. Typical adaptive cruise control systems maintain the host vehicle in a time to target mode. If the target vehicle is moving slowly for long periods of time, such as through heavy traffic, the adaptive cruise control system allows the host vehicle to get closer and closer to the target vehicle as long as the time to the target vehicle is kept the same. Finally, if the target vehicle stops, the host vehicle in a time to target mode will brake aggressively. Additionally, the vehicle may release the brakes as soon as the target vehicle is no longer detected, causing the vehicle to jerk. Some drivers will disable the adaptive cruise control in slow traffic situations for this and other reasons. However, there is a desire for an adaptive cruise control system that is able to operate effectively regardless of the speed of the target vehicle.

SUMMARY

Various embodiments of a controller for a host vehicle having adaptive cruise control comprise an input for receiving a signal indicative of a detected target object; an input for receiving the speed of the host vehicle; and control logic. The control logic is capable of transmitting messages to maintain the vehicle at a preset time gap from the target object upon receiving the signal indicative of a target object; and transmitting messages to set the vehicle at a predetermined following distance from the target object in response to the speed of the host vehicle being less than or equal to a minimum speed.

In accordance with another aspect, various embodiments of a method for controlling a host vehicle having an adaptive cruise control system comprise receiving a signal indicative of a target object; receiving the speed of the host vehicle; and transmitting messages to at least one of an engine controller, a retarder and a brake controller to maintain the vehicle at a predetermined time gap from the target object upon receiving the signal indicative of a target object. The method includes transmitting messages to at least one of the engine controller, the retarder and the brake controller to set the vehicle at a predetermined following distance from the target object in response to the speed of the host vehicle being less than a minimum speed.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
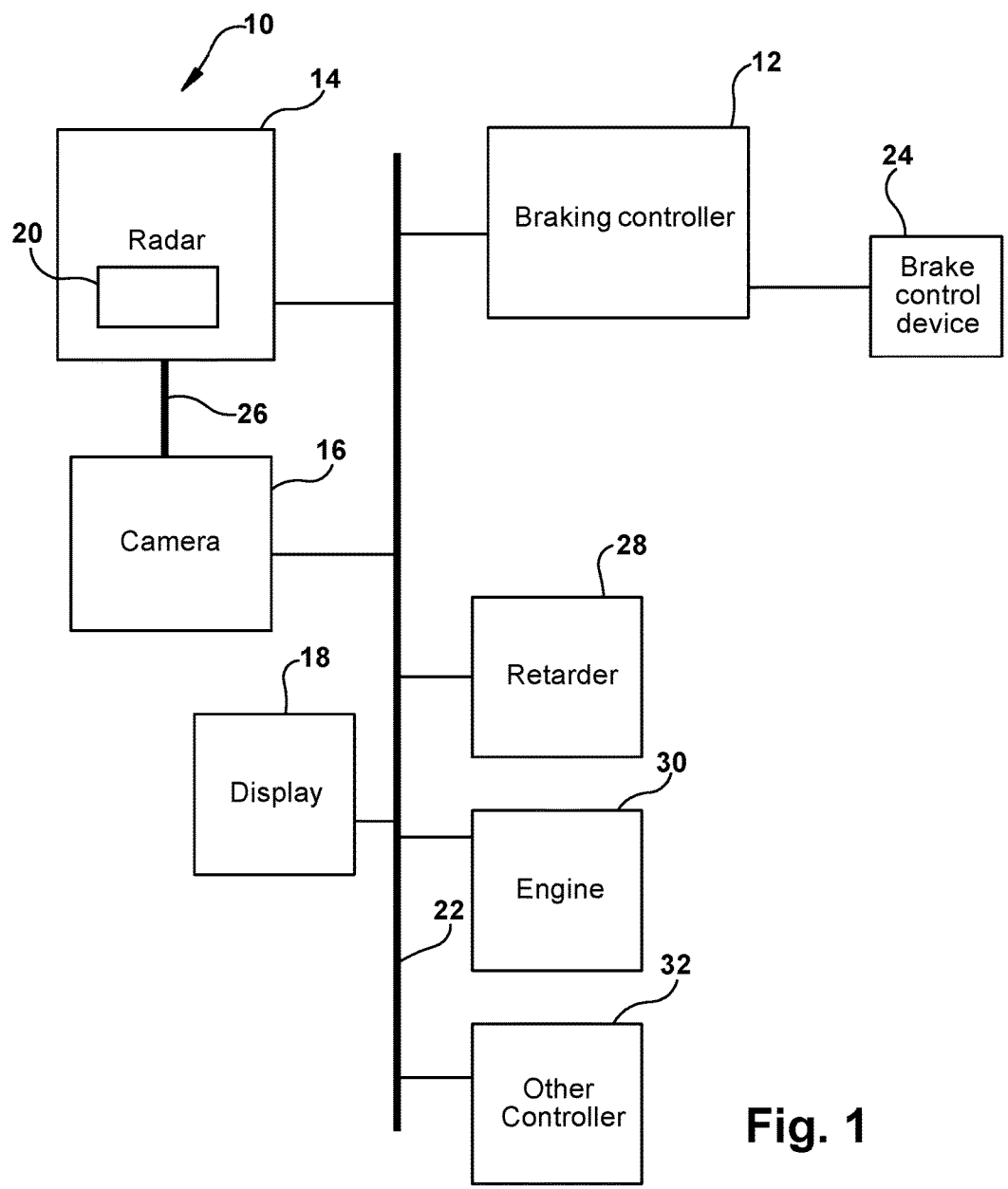
FIG. 1 illustrates a vehicle system having adaptive cruise control according to one example of the invention.

FIG. 1 illustrates an adaptive cruise control system (ACC) 10. The ACC 10 includes a radar controller 14. The radar controller 14 transmits and receives radar signals, which are electromagnetic waves used to detect an object's presence, longitudinal distance, lateral distance, speed and direction with respect to the host vehicle. The radar controller 14 can detect multiple stationary or moving objects within a wide range to the front and sides of the host vehicle. The radar and control functions may be in a single controller or the radar function may be in a separate sensing device. The radar controller 14 may be of the type used in the Bendix® Wingman® Fusion™ Driver Assistance System from Bendix Commercial Vehicle Systems LLC of Elyria Ohio.

The radar controller 14 includes a processor with control logic 20 for receiving and transmitting messages to control the ACC 10. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20.

The control logic 20 may be configured in a speed mode, a time gap mode or a following distance mode. When the calculated time to an object is below a predetermined time to an object, a following alert is transmitted as a threat of a possible collision with the object exists due to the longitudinal distance, lateral distance and relative velocity of the object with respect to the host vehicle. The control logic 20 may also intervene automatically by transmitting messages to decelerate the vehicle in order to maintain the preset time gap.

The ACC 10 includes at least one camera controller 16. The camera controller 16 uses video signals to detect an object's presence, size, longitudinal distance and lateral distance with respect to the host vehicle. The camera controller 16 can detect multiple stationary or moving objects within a wide range to the front and sides of the host vehicle. The camera controller 16 may be of the type used in the Bendix® Wingman® Fusion™ Driver Assistance System from Bendix Commercial Vehicle Systems of Elyria Ohio.

The ACC 10 includes a proprietary vehicle communications bus 26 for communications between the radar controller 14 and the camera controller 16. The control logic 20 is capable of receiving the video signals from the camera controller 16 on the proprietary communications bus 26. The radar controller 14 may also transmit the radar signals on the proprietary communications bus 26. The information from the radar signals and video signals is used by the control logic 20 to determine the longitudinal difference and lateral offset of the detected object from the host vehicle.

The ACC 10 may include a display 18 in the cab of the host vehicle. The display 18 may be an input device for a driver to set the preset time gap. The display 18 may show the distance of the host vehicle from the detected object and a preset time gap to object. The display 18 may show the status of the ACC 10 or other systems on the host vehicle.

The ACC 10 also communicates using a public vehicle communications bus 22 connected to the radar controller 14, the camera controller 16, the display 18, and other controllers on the vehicle. The radar controller 14 may transmit a braking control signal on the vehicle communications bus 22. The radar controller 14 can also transmit a braking activity indicator, a distance to the detected object and a status signal to the vehicle communications bus 22.

A braking system controller 12 communicates with the ACC 10 via the vehicle communications bus 22. The braking system controller 12 receives braking control signals and controls the service brakes of the host vehicle. The braking system controller 12 may also communicate the speed of the host vehicle on the vehicle communications bus 22. The braking system controller 12 includes an output for communicating with at least one brake control device 24. The brake control device 24 may be an electro-pneumatic device that provides air to the service brakes on a wheel end in response to control signals from the braking system controller 12 when the host vehicle is an air-braked commercial vehicle. The braking system controller 12 may be of the type used in the Bendix® ABS-6 Advanced with ESP® System from Bendix Commercial Vehicle Systems of Elyria Ohio.

A retarder 28 communicates with the ACC 10 via the vehicle communications bus 22. The retarder 28 receives deceleration messages and assists in slowing the vehicle in response to the deceleration messages. An engine controller 30 communicates with the ACC 10 via the vehicle communications bus 22. The engine controller 30 is capable of receiving deceleration messages and slows the vehicle in response. The engine controller 30 also receives acceleration messages and propels the vehicle in response. The engine controller 30 may also transmit the speed of the host vehicle on the vehicle communications bus 22. When a target vehicle is detected, the ACC 10 transmits messages to one or more of the braking system controller 12, the engine retarder 28 and the engine controller 30 to maintain the host vehicle at a preset time gap (e.g., 3 seconds or the like) behind the target vehicle.

An other controller 32 may also communicate with the ACC 10 via the vehicle communications bus 22. The other controller 32 may be a dash controller or chassis controller that may communicate vehicle speed on the vehicle communications bus 22. The other controller 32 may be a controller having several switch inputs so that the driver can set the predetermined time gap and/or disable the ACC 10.

Therefore, a controller for a host vehicle having adaptive cruise control comprises an input for receiving a signal indicative of a detected target object, an input for receiving the speed of the host vehicle and control logic. The control logic is capable of transmitting messages to maintain the vehicle at a preset time gap from the target object upon receiving the signal indicative of a target object and transmitting messages to set the vehicle at a predetermined following distance from the target object in response to the speed of the host vehicle being less than or equal to a minimum speed.

Figure 2:
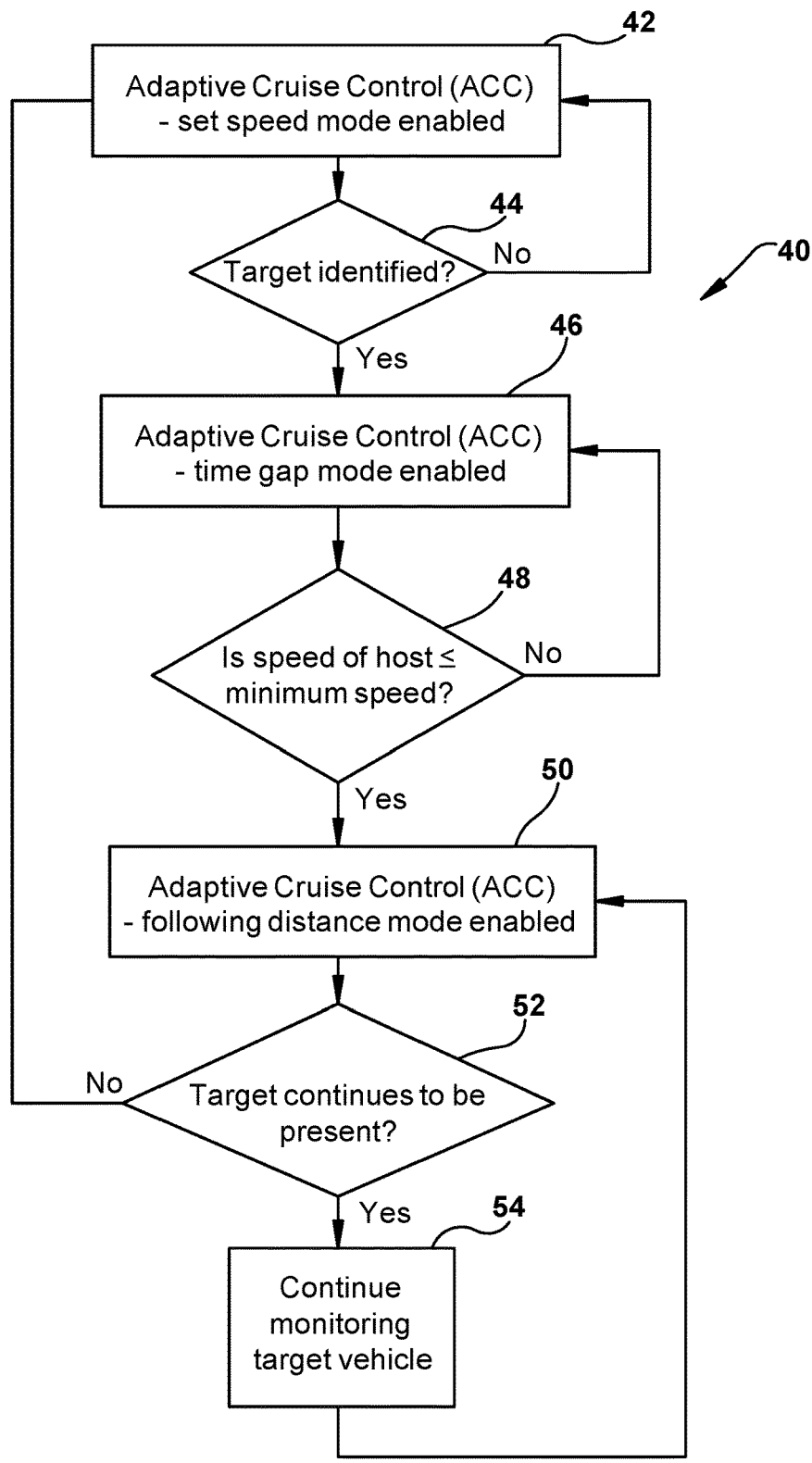
FIG. 2 illustrates a method of implementing an adaptive cruise control system according to one example of the invention.

FIG. 2 illustrates a method 40 of implementing the transition from a time gap mode of the ACC 10 to a following distance mode according to one example of the invention. In step 42, the driver of the host vehicle enables the ACC 10 to maintain a set speed, 55 miles per hour for example.

In step 44, the radar controller 14 and/or camera controller 16 determine if a target vehicle is in front of the host vehicle. If no target vehicle is in front of the host vehicle, the method 40 returns to step 42. If a target vehicle is detected, the method 40 goes to step 46. In step 46, the radar controller 14 will set the ACC 10 in a time gap mode. When the ACC 10 is normally enabled, a time gap mode is the default mode when a target vehicle is detected. The time gap mode setting can be preset by the vehicle manufacturer or can be adjustable by the driver of the vehicle. Normally the time gap is set between 1.8 seconds and 3.5 seconds. The preset time gap is representative of the time that would be required by the host vehicle to travel forward and reach the target vehicle's current location.

In one example, the time gap may be preset by the vehicle operator or the fleet manager at 2.8 seconds. Therefore, the radar controller 14 will transmit deceleration and acceleration commands to the braking controller 12, retarder 28 and/or engine 30 to maintain the host vehicle behind the target vehicle such that there would be 2.8 seconds for the host vehicle to brake before potentially colliding with a suddenly stopped target vehicle. The preset time gap may be adjusted by the driver of the host vehicle in some configurations of ACC, but normally a driver would not be allowed to set the time gap below a minimum time gap of 1.8 seconds.

The radar controller 14 receives the speed of the host vehicle from the braking controller 12 or the engine 30. In step 48, the radar controller 14 compares the host vehicle speed to a predetermined minimum speed. In one example, the predetermined minimum speed is between about three (3) miles per hour and about ten (10) miles per hour. In another example, the predetermined minimum speed is about five (5) miles per hour. If the speed of the host vehicle is greater than the predetermined minimum speed, the method 40 returns to step 46. If the speed of the host vehicle is less than or equal to the predetermined minimum speed, the method 40 proceeds to step 50.

In step 50, the radar controller 14 sets the ACC 10 in a following distance mode. In a following distance mode, the preset time gap is no long used and a predetermined distance between the target vehicle and host vehicle is maintained. In one example, the predetermined distance is about twenty (20) feet. Therefore, the radar controller 14 will transmit deceleration and acceleration commands to the braking controller 12, retarder 28 and engine 30 to maintain the host vehicle behind the target vehicle such that there is consistently about twenty (20) feet between the fender of the host vehicle and the bumper of the target vehicle.

In one example, the following distance may be set using the preset time gap. If the preset time gap was 2.8 seconds, the following distance would be set at 20.5 feet because 20.5 feet is the distance the vehicle would be when the host vehicle was traveling at five (5) mph. If the preset time gap was 1.8 seconds, the following distance would be set at 13.2 feet. In yet another example, the following distance is set based on the speed the host vehicle was traveling when the ACC 10 is set in the following distance mode. For example, if the time gap was 2.8 seconds and the ACC 10 is set in following distance mode at eight (8) mph, the following distance would be set at 32.9 feet.

This following distance allows for the host vehicle to brake gradually well before potentially colliding with a suddenly stopped target vehicle. When the host vehicle is a tractor trailer or other large commercial vehicle, the distance required to come to a complete stop once braking is initiated is generally longer than for a small car or motorcycle. It is desired to have fewer and less aggressive brake applications for driver comfort. If the preset time gap was maintained as the host vehicle was slowing down, the distance to the target vehicle may in turn become infinitely small, as will be shown on FIG. 3.

In step 52, the radar controller 14 and camera controller 16 determine if the target vehicle is still present. If the target vehicle is still present, the radar controller 14 and camera controller 16 continue to monitor the target vehicle in step 54. From step 54, the method 40 goes to step 50 to remain in the following distance mode.

If the target vehicle has moved out of range of the host vehicle, by speeding up or leaving the roadway and no other target vehicle is detected by the radar controller 14 and/or camera controller 16 in step 52, the radar controller 14 will return the host vehicle to the regular cruise control mode by returning to step 42. Any brake application will be released gradually as the vehicle is allowed to return to the speed mode. The method 40 will remain in the speed mode until another target vehicle is identified.

Therefore, a method for controlling a host vehicle having an adaptive cruise control system comprises receiving a signal indicative of a target object, receiving the speed of the host vehicle and transmitting messages to at least one of an engine controller, a retarder and a brake controller to maintain the vehicle at a predetermined time gap from the target object upon receiving the signal indicative of a target object. The method includes transmitting messages to at least one of the engine controller, the retarder and the brake controller to set the vehicle at a predetermined following distance from the target object in response to the speed of the host vehicle being less than a minimum speed.

Figure 3:
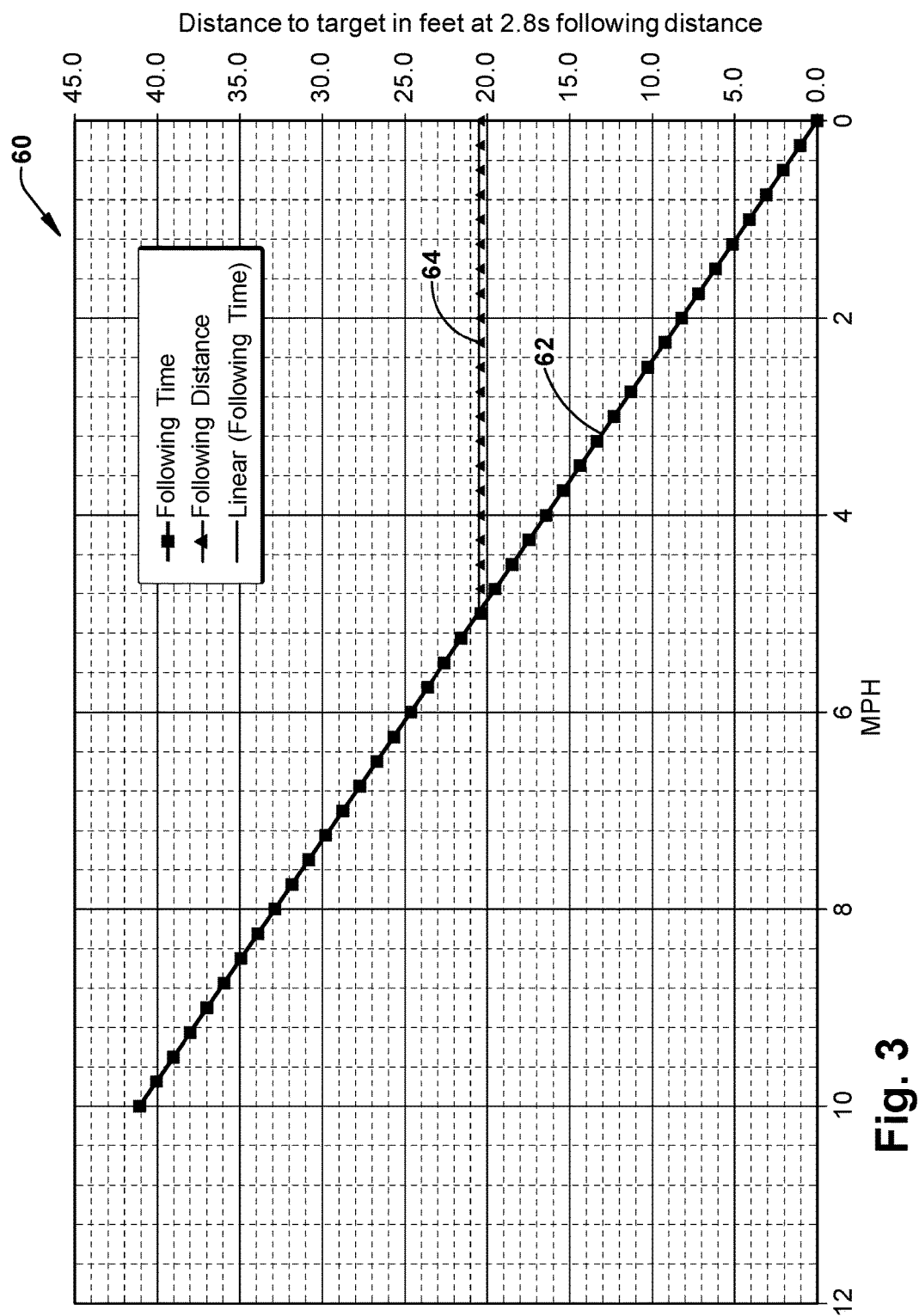
FIG. 3 illustrates a graph comparing following distance and following time in an adaptive cruise control system.

FIG. 3 is a graphical representation 60 of the difference between the time gap mode, illustrated by line 62, and the following distance mode, illustrated by line 64. Speed in miles per hour is shown on the X-axis and a distance to a detected target vehicle in feet is shown on the Y-axis.

If the time gap is set at 2.8 seconds, then the distance to a target would be about forty (40) feet when the host vehicle is traveling at ten (10) miles per hour, as shown on line 62. At about five miles per hour, the distance to the target vehicle is about twenty (20) feet. However, at four miles per hour, the distance is reduced to about sixteen (16) feet, which may not be enough space to brake comfortably in order to avoid a collision if the target vehicle were to suddenly stop. At two (2) miles per hour, which is a feasible speed for slow traffic, the distance would be reduced to about eight (8) feet in the time gap mode.

However, if the radar controller 14 as described is programmed to transition ACC 10 to a following distance only mode at a predetermined low speed, such as about five (5) miles per hour, the distance to the target would remain at about twenty (20) feet as long as the speed of the host vehicle was about five (5) miles per hour or less, as shown by line 64. The twenty (20) feet represents the ACC 10 transitioning to the following distance mode at about five (5) miles per hour when the time gap was set at 2.8 seconds.

Systems that use engine only modes instead of braking to deceleration in response to a detected object also benefit from this invention.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a host vehicle for adaptive cruise control, wherein the controller is configured to perform a method, the method comprising:
receiving a signal indicative of a detected target object;
receiving a speed of the host vehicle;
transmitting messages to maintain the host vehicle at a preset time gap from the detected target object upon receiving the signal indicative of the detected target object; and
transmitting acceleration and deceleration messages to at least one of an engine controller, a retarder and a brake controller to set the host vehicle at a predetermined following distance from the detected target object in response to the speed of the host vehicle being less than or equal to a minimum speed, wherein the predetermined following distance is based on the preset time gap and the speed of the host vehicle at the time the host vehicle is set at the predetermined following distance.

2. The controller as in claim 1, wherein the controller is further configured to transmit messages to return the host vehicle to a predetermined cruise control speed in response to a signal indicating the detected target object is no longer detected.

3. The controller as in claim 1, wherein the controller is further configured to receive a lateral distance between the host vehicle and the detected target object and transmit messages to maintain the predetermined following distance in response to the lateral distance being less than or equal to a predetermined lateral distance.

4. The controller as in claim 1, wherein the minimum speed is between about three miles per hour and about ten miles per hour.

5. The controller as in claim 1, the controller is further configured to transmit messages to maintain the host vehicle at the preset time gap in response to the host vehicle traveling at greater than the minimum speed.

6. A method for controlling a host vehicle having an adaptive cruise control system, the method comprising:
receiving a signal indicative of a detected target object;
receiving a speed of the host vehicle;
transmitting messages to at least one of an engine controller, a retarder and a brake controller to maintain the host vehicle at a predetermined time gap from the detected target object upon receiving the signal indicative of the detected target object; and
transmitting messages to at least one of the engine controller, the retarder and the brake controller to set the host vehicle at a predetermined following distance from the detected target object in response to the speed of the host vehicle being less than or equal to a minimum speed wherein the predetermined following distance is determined from the predetermined time gap and the host vehicle speed at the time the host vehicle is set at the predetermined following distance.

7. The method as in claim 6, further comprising: transmitting messages to at least one of the engine controller, the retarder and the brake controller to return the host vehicle to a predetermined cruise control speed in response to the signal indicating the detected target object is no longer detected.

8. The method as in claim 6, further comprising displaying the predetermined time gap and the predetermined following distance to a vehicle operator.

9. The method as in claim 6, wherein the minimum speed is between about three miles per hour and ten miles per hour.

* * * * *